July 7, 1959 R. H. HANCOCK 2,893,104
AIR SUSPENSION
Filed May 23, 1957
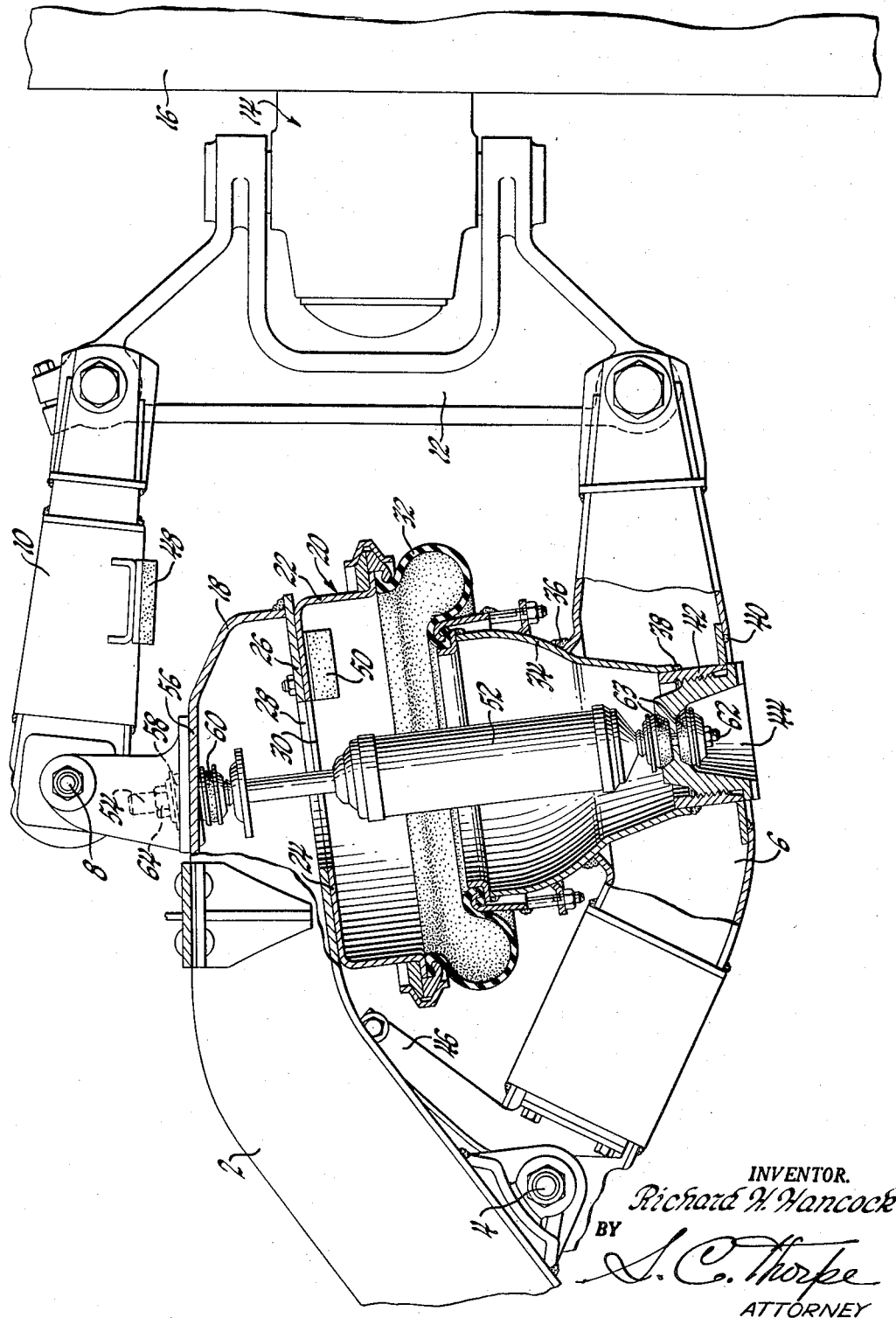
INVENTOR.
Richard H. Hancock
BY
J. C. Thorpe
ATTORNEY

United States Patent Office 2,893,104
Patented July 7, 1959

2,893,104

AIR SUSPENSION

Richard H. Hancock, Orchard Lake, Mich., assignor to General Motors Corporation, Detroit, Mich., a corporation of Delaware Application May 23, 1957, Serial No. 661,121

4 Claims. (Cl. 267—15)

The present invention has to do with the unique location and connection of shock absorbers provided between sprung and unsprung portions of automotive vehicles utilizing pneumatic suspensions. The use of pneumatic bellows between sprung and unsprung portions of vehicles, in some instances, requires more space than the springs of prior suspensions because of the need for sufficient air containing volume to provide the suspension with the proper spring characteristics. Consequently, such space previously has been lost for the location of many other parts of the vehicle also related to its suspension. The present invention, however, takes advantage of this so-called lost space by uniquely locating shock absorbing assemblies concentrically within the bellows so that not only is the shock absorber protected but it is placed in a location which would otherwise constitute lost space. Unique means are also provided for simply and quickly changing such shocks in the event there is need for their replacement or repair.

For a better understanding of the invention and the objects thereof, reference may be had to the accompanying detailed description taken in combination with the single sheet of drawings which represents a single front elevation view with parts in section and broken away of a portion of an automotive vehicle having a pneumatic suspension including a uniquely located and connected shock absorber.

Referring to the drawing, a transversely extending vehicle front frame member 2 is shown having pivotally fastened thereto at pivotal point 4 a lower arm 6. Also fastened to the frame member 2 for pivotal movement about point 8 in a plane including member 2 is an upper arm 10. The ends of these arms are pivotally linked together by a knuckle support 12 which supports the knuckle assembly indicated generally by numeral 14. The knuckle assembly 14 has in a conventional manner a wheel spindle fixed thereto for rotatably supporting wheel hub 16. Interposed between an end 18 of frame member 2 and lower arm 6 intermediate the ends thereof is an air bellows assembly indicated generally by a numeral 20. Assembly 20 includes an upper can or container 22 having an upwardly facing wall 24 welded or otherwise suitably secured to a plate 26 forming the lower wall of member 2. It will be observed that member 2 is hollow as indicated by the broken away portion at its end 18 to thereby form an air containing reservoir to increase the volume of air available for compression and expansion during action of the air bellows assembly 20. A wall or obstruction is located in frame 2 to the left of pivotal point 4 when viewing the drawing, which prevents any loss or transmittal of air located in member 2 beyond the wall. The plate 26 and wall 24 are provided with aligned openings 28 and 30 which allow free communication of air between the interior of member 2 and the upper can 22. Suitably clamped to the lower edge of can 22 is the upper edge of a resilient cup-like bellows or diaphragm which is preferably made of rubber composition. The opposite end of this bellows is clamped to the upper edge assembly of a lower can or container 34 which, as indicated by the welds 36, 38 and 40, extends through and is fixed to the lower arms 6. The lower end of can 34 is provided with an internally threaded extension 42 which has threaded therein a plug 44 closing the lower end of container 34. Thus, it will be readily appreciated that the frame member 2 will be resiliently supported by the arm 6 through the medium of an air bellows assembly 20 when such assembly is suitably inflated. Air may be supplied and exhausted from bellows 20 and the interior of frame member 2 in the usual manner by means of a valve assembly connected to an air pressure source and exhaust port (not shown), which valve assembly is actuated by arm 46 sensing changes in deflection between frame member 2 and arm 6. Movement of arm 10 toward member 2 is limited by resilient stop 48 adapted to engage the end 18 of member 2. Also, movement of frame 2 and arm 6 toward each other is limited by resilient stop 50 located within the can 22 and fastened to the upper wall 24 thereof. The lower end of the stop 50 is adapted to abut the upper end of lower can 34 and the lower edge of diaphragm 32.

Concentrically located within the air bellows assembly 20 is a shock absorbing assembly 52. This assembly has the rod end 54 thereof extending through the openings 30 and 28 into the interior of member 2 and upwardly through the upper wall 56 thereof. The rod end is provided with upper and lower resilient spherically shaped bushing assemblies 58 and 60, respectively, located on opposite sides of wall 56 which not only prevent metal to metal contact so as to eliminate noise but also serve as sealing means for the hole in end wall 56 through which the end 54 of the rod end shock absorber 52 extends. The lower end of shock absorbing assembly 52 is provided with a threaded stud 62 which extends through an opening provided in plug 44. Again, in this case double frustum-shaped rubber bushings 63 are located on stud 62 on opposite sides of the upper wall of plug 44 so as to prevent metal to metal contact and also act as seals to prevent the loss of any air from the air bellows assembly 20 or the interior of the frame member 2 through plug 44.

To remove the shock asborbing assembly from the interior of the air bellows assembly 20, it is merely necessary to remove the nut 64 on the rod end 54 of the shock absorbing assembly and also the upper resilient bushing 58. The plug 44 is then unscrewed and the entire shock absorber assembly may be removed as a unit thereby facilitating simple and expeditious maintenance and repair or replacement.

From the foregoing it will be appreciated that the interior of the air bellows assembly has been taken advantage of in a unique way to desirably locate a shock absorbing assembly which is not only protected but enables valuable space between sprung and unsprung vehicle portions which would otherwise be lost to be utilized. Similar advantage is taken of the interior of the bellows to uniquely locate limit stops between the sprung and unsprung portions. By providing a unique plug and suitable fastenings for the upper and lower ends of the shock absorber, it may be easily and quickly removed for any attention it might need.

I claim:

1. In a front wheel vehicle suspension including a hollow frame member forming an air reservoir, a lower arm pivotally connected to said frame member for movement in a vertical plane containing said frame member, a resilient air bellows assembly interposed between said frame member and arm removed from said pivotal point and supporting said frame member on said arm, said bellows assembly having an open upper end in registry with an opening in said frame member, and shock absorbing means concentrically located within said bellows and having a lower end secured to said arm and an upper end extending through said opening and secured to said frame member.

2. In a vehicle front end suspension including a transversely extending frame member having upper and lower arms pivotally connected thereto, a knuckle support pivotally linking the free ends of said arms together, an air bellows assembly interposed between and connected to the underside of said member and said lower arm removed from the point of pivotal connection of said lower arm to said member whereby said member is resiliently supported thereby on said lower arm, shock absorbing means concentrically located within said bellows, said shock absorbing means having a lower end and fastened to said lower arm and an upper end fastened to said frame, and detachable means associated with said lower arm and lower end of said shock absorbing means, said last mentioned means enabling installation and removal of said shock absorbing means while said bellows is in assembled relation with said frame and lower arm.

3. In a suspension including sprung and unsprung assemblies, a combined air containing resilient bellows and shock absorbing assembly between said sprung and unsprung assemblies resiliently supporting one on the other for movement relative thereto and for damping such movement, comprising an upper container fixed to said sprung assembly and a lower container fixed to the unsprung assembly, a cup-shaped flexible diaphragm hermetically connecting said containers together and forming therewith a resilient air bellows assembly, one of said containers having an open end, a removable plug secured in said open end, and a shock absorber located within said bellows assembly of smaller diameter than said plug and having a lower end secured thereto and an upper end secured to the sprung assembly.

4. In a suspension including sprung and unsprung assemblies, a combined air containing resilient bellows and shock absorbing assembly between said sprung and unsprung assemblies resiliently supporting one on the other for movement relative thereto and for damping such movement, comprising an upper substantially vertically extending container fixed to said sprung assembly and a lower substantially vertically extending container fixed to the unsprung assembly in alignment with said upper container, a cup-shaped flexible diaphragm extending between said containers hermetically connecting said containers together and forming therewith a resilient air bellows assembly, the lower of said containers having a lower open end, a removable plug secured in said open end, a substantially vertically extending shock absorber located within said bellows assembly of smaller diameter than said plug and having an upper end secured to said sprung assembly and having a stud on the lower end thereof extending through a hole in said plug, a pair of resilient rubber bushings mounted on said stud on opposite sides of the hole through which said stud extends and fastening means to maintain said bushings in sealing engagement with said plug whereby slight freedom of movement of said stud is afforded relative to said plug without metal to metal contact and leakage about said hole is prevented.

References Cited in the file of this patent

UNITED STATES PATENTS

| | | |
|---|---|---|
| 2,056,106 | Kuhn | Sept. 29, 1936 |
| 2,226,605 | Geyer et al. | Dec. 31, 1940 |
| 2,692,618 | Ludowici | Oct. 26, 1954 |